(12) United States Patent
Tsang

(10) Patent No.: US 7,646,380 B2
(45) Date of Patent: *Jan. 12, 2010

(54) CORRECTION OF ALIGNMENT AND LINEARITY ERRORS IN A STYLUS INPUT SYSTEM

(75) Inventor: Michael H. Tsang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 523 days.

This patent is subject to a terminal disclaimer.

(21) Appl. No.: 11/466,003

(22) Filed: Aug. 21, 2006

(65) Prior Publication Data

US 2006/0279556 A1 Dec. 14, 2006

Related U.S. Application Data

(63) Continuation of application No. 10/799,636, filed on Mar. 15, 2004, now Pat. No. 7,106,311, and a continuation of application No. 09/918,482, filed on Aug. 1, 2001, now Pat. No. 6,727,896.

(51) Int. Cl.
G06F 3/041 (2006.01)
G06K 11/06 (2006.01)
(52) U.S. Cl. ............... 345/178; 345/174; 178/18.02
(58) Field of Classification Search ............... 345/173, 345/178
See application file for complete search history.

(56) References Cited

U.S. PATENT DOCUMENTS

| | | | | |
|---|---|---|---|---|
| 4,243,843 A | * | 1/1981 | Rocheleau | 178/19.03 |
| 4,479,032 A | * | 10/1984 | Parnell | 178/19.01 |
| 4,575,581 A | * | 3/1986 | Langberg | 178/18.02 |
| 4,650,926 A | | 3/1987 | Nakamura et al. | |
| 4,678,869 A | | 7/1987 | Kable | |
| 4,740,660 A | | 4/1988 | Kumura | |
| 4,745,565 A | | 5/1988 | Garwin et al. | |
| 5,051,736 A | | 9/1991 | Bennett et al. | |
| 5,117,071 A | | 5/1992 | Greanias et al. | |
| 5,276,282 A | | 1/1994 | Russell | |
| 5,341,155 A | | 8/1994 | Elrod et al. | |
| 5,686,705 A | * | 11/1997 | Conroy et al. | 178/18.05 |
| 5,751,276 A | * | 5/1998 | Shih | 345/178 |
| 5,757,361 A | | 5/1998 | Hirshik | |
| 5,940,065 A | | 8/1999 | Babb et al. | |
| 6,548,768 B1 | * | 4/2003 | Pettersson et al. | 178/18.01 |
| 6,624,832 B1 | | 9/2003 | Thomas | |
| 2003/0056999 A1 | * | 3/2003 | Fukuda | 178/18.02 |

OTHER PUBLICATIONS

Digitizer Technology: Performance Characteristics and the Effects on the User Interface Ward, J.R.; Phillips, M.J.; Computer Graphics and Applications, IEEE vol. 7, Issue 4, Apr. 1987 pp. 31-44.*

* cited by examiner

Primary Examiner—Richard Hjerpe
Assistant Examiner—Dorothy Webb
(74) Attorney, Agent, or Firm—Shook, Hardy & Bacon LLP

(57) ABSTRACT

A method and system for correcting alignment and linearity errors in devices using a finger or stylus input device with a display device interactively coupled to a digitizer is disclosed. Touching intersections in a calibration grid on the display device may be performed to create a linearity map. Subsequently, detected stylus input is mapped to a sector in the linearity map, and resultant screen coordinates are calculated using ratios within a reference rectangle corresponding to the detected stylus input and the mapped sector.

15 Claims, 10 Drawing Sheets

○ =CALIBRATION GRID POINT
▫ =DETECTED DIGITIZER POINT

○ SCREEN POINTS
● PEN POINTS

```
typedef struct _MAP_PT
{
    USHORT wScreenPtX;
    USHORT wScreenPtY;
    USHORT wPenPtX;
    USHORT wPenPtY;
} MAP_PT, *PMAP_PT;

typedef struct _LINEAR_MAP
{
   ULONG  dwcbLen;
   USHORT wNumXPts;
   USHORT wNumYPts;
   MAP_PT PtMap[NUM_LINEAR_YPTS][NUM_LINEAR_XPTS];
} LINEAR_MAP, *PLINEAR_MAP;
```

○ = CALIBRATION GRID POINT
□ = DETECTED DIGITIZER POINT

○ SCREEN POINTS
● PEN POINTS

Xscreen = PtMap[iy][ix].wScreenPtX + ((Xpen − x1)*

(PtMap[iy][ix+1].wScreenPtX − PtMap[iy][ix].wScreenPtX))/

(x2 − x1);

Yscreen = PtMap[iy][ix].wScreenPtY + ((Ypen − y1)*

(PtMap[iy+1][ix].wScreenPtY − PtMap[iy][ix].wScreenPtY))/

(y2 − y1);

CORRECTION OF ALIGNMENT AND LINEARITY ERRORS IN A STYLUS INPUT SYSTEM

This application is a continuation of and claims priority from application Ser. No. 10/799,636, filed Mar. 15, 2004, which is a continuation of application Ser. No. 09/918,482, filed Aug. 1, 2001, now U.S. Pat. No. 6,727,896, issued Apr. 27, 2004, all of the same title.

FIELD OF THE INVENTION

One or more aspects of the invention relates to computing devices using a stylus input device. More specifically, aspects of the invention relate to a method and system for correcting alignment and linearity errors when a stylus digitizer is used in combination with a display screen to provide input to a computing system.

BACKGROUND OF THE INVENTION

Portable computing systems, such as personal digital assistants (PDA), often have a stylus or other pen-like input device for receiving user input. For instance, a user may use a pen-like stylus to interact with a PDA by pressing the stylus against a display screen. The display screen is generally an LCD display. Depending on the type of digitizer used, the user may physically touch the stylus to the LCD display screen or bring the stylus close to the screen so that the digitizer can detect the presence of the stylus. The digitizer would then detect the stylus proximity or contact and translate it into a location on the display. The PDA further processes the location to determine how to respond to the user input.

In order to capture a user's input regardless of where the user places the stylus on the LCD display, digitizers typically are larger than the dimensions of the LCD display itself. That is, the digitizer generally extends beyond the area of the LCD display, as shown in FIG. 3, such that the digitizer can better detect when the user places the stylus at or near the edges of the LCD display.

Because the digitizer generally encompasses a larger area than the LCD display, the system using the digitizer and display must map the user's input from the digitizer to the LCD. For instance, if the user places the stylus at LCD pixel location 0,0, it generally does not correspond to digitizer position 0,0 because the digitizer extends beyond the dimensions of the display, as discussed above and shown in FIG. 3. The digitizer position corresponding to 0,0 on the LCD may actually be a position such as 100,100, depending on the resolution of the digitizer.

Mapping between the digitizer and the LCD is further complicated by the fact that digitizers and LCD displays often have different resolutions. Typical display resolutions extend from less than 600×400 pixels to 1280×1024 pixels and higher, with multiple resolutions possible on various sized display screens. Digitizers, also, are created with various levels of resolution. For instance, digitizers generally have resolutions between 100 and 1000 pixels per inch. However, higher or lower resolutions are also possible. Because of these resolution differences between the LCD display and the digitizer, there is typically not a 1-to-1 mapping between the LCD display and the digitizer. Thus, complicated calculations are often required to map from the digitizer to the display.

Digitizers used to detect stylus input generally include resistive digitizers and radio frequency (RF) digitizers, both of which are known in the art. Both types of digitizers sense the location that a user places the stylus on a display device. However, an RF digitizer can sense the stylus even when it is not touching the display device. RF digitizers may have various degrees of sensitivity, such that the digitizer may sense the RF stylus when it is within an approximate distance from the digitizer, such as within one inch of the digitizer, within 6 inches, within ½ inch, or other similar measure, which may result in the digitizer sensing the stylus before it actually contacts the display device.

However, input problems with the stylus can occur because an electromagnetic-based pen digitizer is non-linear, especially close to its edges and corners. This can be caused by field distortion from the interference of a metal frame and/or other electronics around the edges. Interference may also come from electronic components placed beneath the digitizer. FIG. 4 shows lines drawn using a straight edge ruler on a device that has no linearity compensation. If the digitizer is used independently without an LCD display on top, a user may not notice the linearity problem because the resultant input is not displayed. However, when used with an LCD display on top, the user will notice that the stylus tip aligns with the detected input position very well in some areas but that they drift apart in other areas, such as area 250, caused by a hard disk drive located beneath the digitizer. This distortion can create a usability problem because the user may not be able to accurately interact with the computing device, causing the user to become frustrated and stop using the device.

Known previous methods have attempted to compensate for alignment differences, but have neglected linearity problems. For instance, known alignment methods use two to five point alignment. That is, a computer device prompts the user to interact with the display using the stylus input device two to five times at various locations to establish the offset and alignment parameters between the digitizer and the display device. While this may correct the alignment between the digitizer and LCD, linearity problems remain unresolved.

While digitizer manufacturers have included limited linearity correction built-in to digitizer firmware, these digitizers often do not contain enough processing power or memory to fully compensate areas of high distortion. Thus, a solution is needed that can correct for alignment and linearity errors when an LCD or other display device is used in conjunction with a pen digitizer to receive user input in a computing system.

BRIEF SUMMARY OF THE INVENTION

Aspects of the invention provide a flexible and efficient method and system for correcting alignment and linearity errors in a device that uses a stylus input device. In a first aspect of the invention, there is a linearity map including an array of data points, wherein each data point comprises data corresponding to known screen coordinates and corresponding input coordinates.

In a further aspect of the invention, there is a method of creating a linearity map. A data processing system displays a calibration grid on a display device connected to a digitizer such that user input may be provided by interacting directly with the display device. A stylus input device is used to touch each intersection in the calibration grid displayed on the screen while the digitizer detects the input coordinates for each intersection. The system records each intersection's screen coordinates and corresponding detected digitizer coordinates in the linearity map.

In a further aspect of the invention, there is a method for correcting input errors in a data processing system using a stylus input device and a digitizer. The digitizer detects input from the stylus input device. The data processing system then determines in which sector of a linearity map the detected stylus input is located, and calculates a reference rectangle based on the detected point in the sector. The system then may calculate a screen point corresponding to the stylus input point based on the reference rectangle and the linearity map. The method may be embodied in computer readable instructions stored on a computer readable medium.

In a further aspect of the invention, there is a data processing system including a stylus input device, a digitizer, a display screen on top of the digitizer, a processor, and a memory storing computer readable instructions that, when executed by the processor, cause the data processing system to perform a set of steps. The digitizer detects input from the stylus input device. The data processing system then determines in which sector of a linearity map the detected stylus input is located, and calculates a reference rectangle based on the detected point in the sector. The system then may calculate a screen point corresponding to the stylus input point based on the reference rectangle and the linearity map.

DETAILED DESCRIPTION OF THE INVENTION

Figure 1:
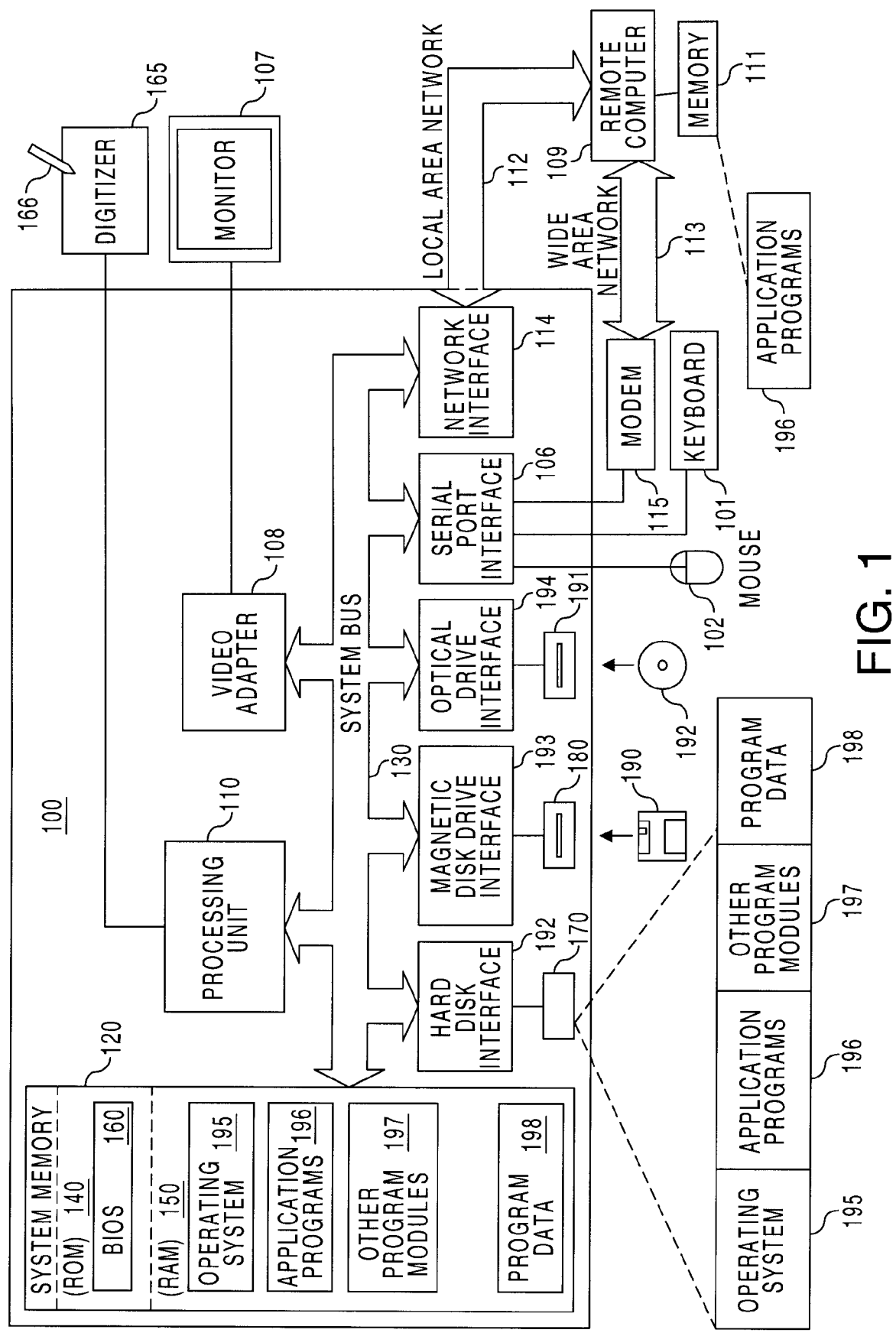
FIG. 1 illustrates an exemplary computing environment in which one or more embodiments of the present invention may be implemented.

Embodiments and aspects of the present invention may be more readily described with reference to FIGS. 1-14. FIG. 1 illustrates a schematic diagram of a conventional general-purpose digital computing environment that can be used to implement various aspects of the present invention. In FIG. 1, a computer 100 includes a processing unit 110, a system memory 120, and a system bus 130 that couples various system components including the system memory to the processing unit 110. The processing unit 110 may include one or more processors. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A display device 107 such as a monitor, LCD display, or other type of display device is also connected to the system bus 130 via an interface, such as a video adapter 108. In addition to the monitor, personal computers typically include other peripheral output devices (not shown), such as speakers and printers. In a preferred embodiment, a pen digitizer 165 and accompanying pen or stylus 166 are provided in order to digitally capture freehand input. Although a direct connection between the pen digitizer 165 and the processing unit 110 is shown, in practice, the pen digitizer 165 may be coupled to the processing unit 110 via a serial port, parallel port or other interface and the system bus 130 as known in the art. Furthermore, although the digitizer 165 is shown apart from the monitor 107, it is preferred that the usable input area of the digitizer 165 be co-extensive with the display area of the monitor 107. Further still, the digitizer 165 may be integrated in the monitor 107, or may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are examples and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Although the FIG. 1 environment shows an example environment, it will be understood that other computing environments may also be used. For example, one or more embodiments of the present invention may use an environment having fewer than all of the various aspects shown in FIG. 1 and described above, and these aspects may appear in various combinations and subcombinations that will be apparent to one of ordinary skill.

Figure 2:
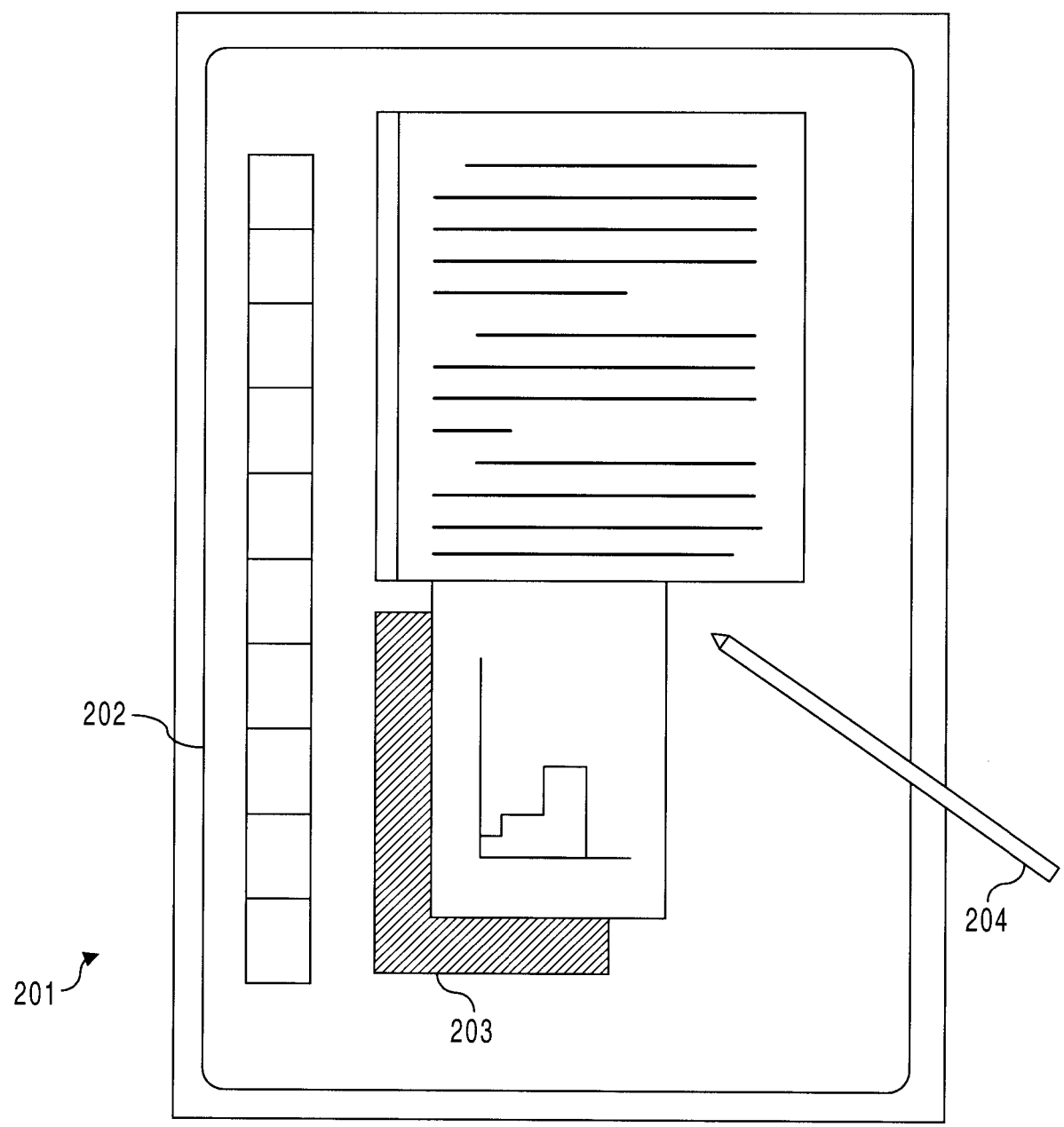
FIG. 2 illustrates an exemplary tablet computer configuration on which one or more embodiments of the present invention may be implemented.
Figure 3:
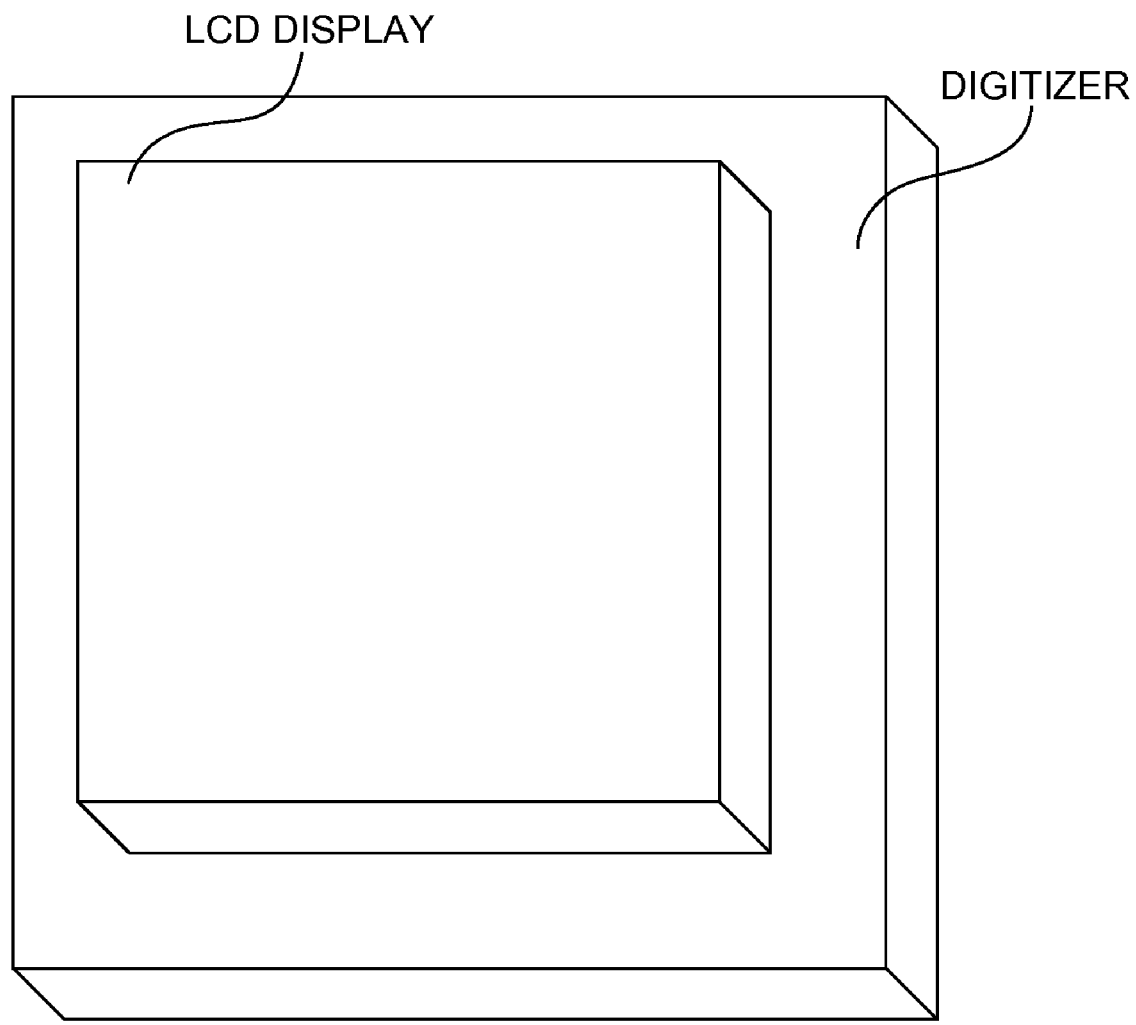
FIG. 3 illustrates a perspective view of a display device over a pen digitizer.

FIG. 2 illustrates a tablet personal computer (PC) 201 that can be used in accordance with various aspects of the present invention. Any or all of the features, subsystems, and functions in the system of FIG. 1 can be included in the computer of FIG. 2. Tablet PC 201 includes a large display surface 202, e.g., a digitizing flat panel display, preferably, a liquid crystal display (LCD) screen, on which a plurality of windows 203 is displayed. Using stylus 204, a user can select, highlight, and write on the digitizing display area. Examples of suitable digitizing display panels include electromagnetic pen digitizers, such as the Mutoh or Wacom pen digitizers. Other types of pen digitizers, e.g., optical digitizers, may also be used. Tablet PC 201 interprets marks made using stylus 204 in order to manipulate data, enter text, and execute conventional computer application tasks such as spreadsheets, word processing programs, and the like.

A stylus could be equipped with buttons or other features to augment its selection capabilities. In one embodiment, a stylus could be implemented as a "pencil" or "pen", in which one end constitutes a writing portion and the other end constitutes an "eraser" end, and which, when moved across the display, indicates portions of the display are to be erased. Other types of input devices, such as a mouse, trackball, or the like could be used. Additionally, a user's own finger could be used for selecting or indicating portions of the displayed image on a touch-sensitive or proximity-sensitive display. Consequently, the term "user input device", as used herein, is intended to have a broad definition and encompasses many variations on well-known input devices.

For exemplary purposes within this disclosure, a display device with a display resolution of 1024×768 and a digitizer with a resolution of 1000 pixels/inch are used. However, it will be understood that one may easily adapt one or more embodiments of the present invention for display devices and digitizers with other resolutions. The combination of a display device placed over a digitizer may be referred to as an LCD Digitizer.

Figure 5:
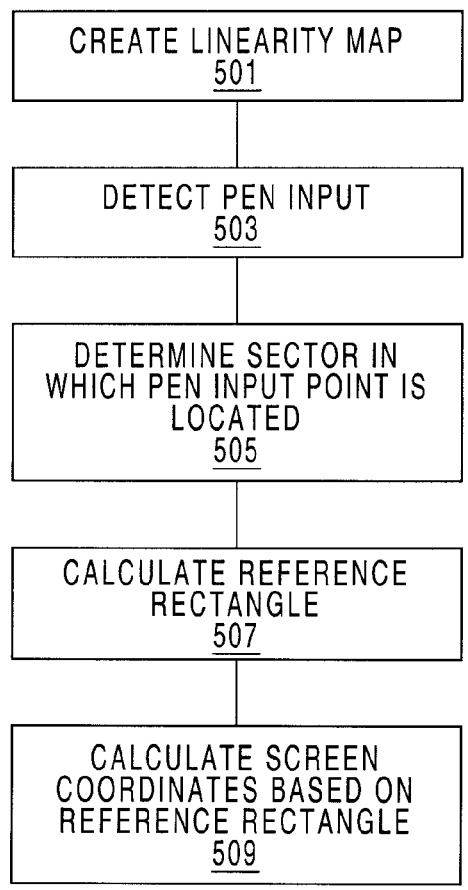
FIG. 5 illustrates a flowchart of a method of performing linearity compensation according to one embodiment of the invention.

FIG. 5 shows a flowchart of a method for performing linearity compensation according to one embodiment of the invention. Initially, in step 501, a linearity map is created. The linearity map reduces linearity errors to produce easier and more accurate user input and usability, as described below. In one embodiment of the invention, the linearity map may be a two-dimensional grid of calibrated points used to calculate the compensation for the actual position of a stylus tip on an LCD Digitizer. The map may be a two-dimensional array of points where each point contains a predetermined screen point and the corresponding stylus input point acquired in a calibration process, described in more detail below. The array of points creates sectors, defined by four points in the calibration grid that define a square. It should be understood that other calibration grids may contain sectors of varying shapes and sizes. When the system detects stylus input in step 503, the system queries the linearity map in step 505 to find the sector containing the stylus input point. In step 507 the system uses the data of the four corners of the sector to create a containing rectangle, referred to as a reference rectangle, and performs a linear interpolation to map the input to the corresponding screen location in step 509, further described below.

Further embodiments may also be adapted to accommodate non-linear as well as linear maps. A non-linear map, shown in FIG. 6B, is one that uses denser data points in higher distortion areas on an LCD than in lower distortion areas in order to provide better linearity compensation in the high distortion areas. Hardware with high distortion areas, e.g. due to a hard disk drive, may use a non-linear map. For exemplary purposes, a linear map is used.

Linearity maps with higher resolution generally produce better linearity compensation. However, as the resolution of the linearity map approaches the resolution of the display device, more processor time and speed is required to perform various lookup functions and data calculations. For example, some high-resolution pen tablets have data rates greater than 120 points detected per second. Because compensation is generally performed for each stylus input point detected, data processing for linearity maps with high resolutions will quickly consume system processor time and other system resources. Conversely, as the linearity map's resolution gets lower, less system resources are used but linearity compensation is less accurate. Thus, a resolution should be used that produces acceptable linearity compensation with a minimum effect on system resources.

Figure 6A:
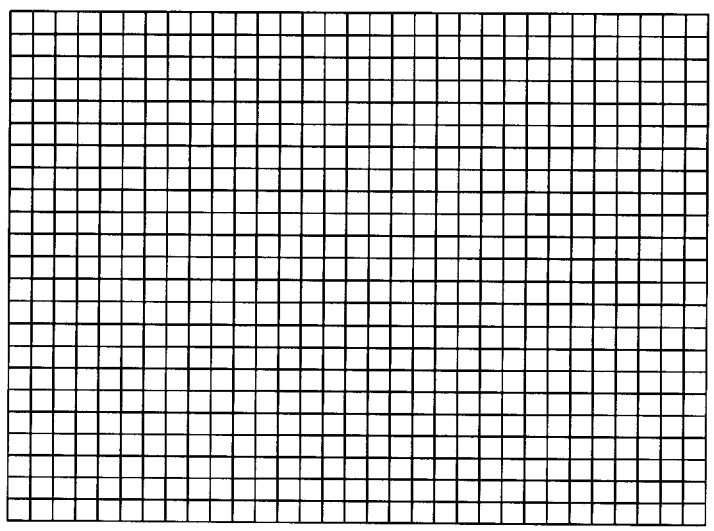
FIG. 6A illustrates a uniform calibration grid.
Figures 6B, 7:
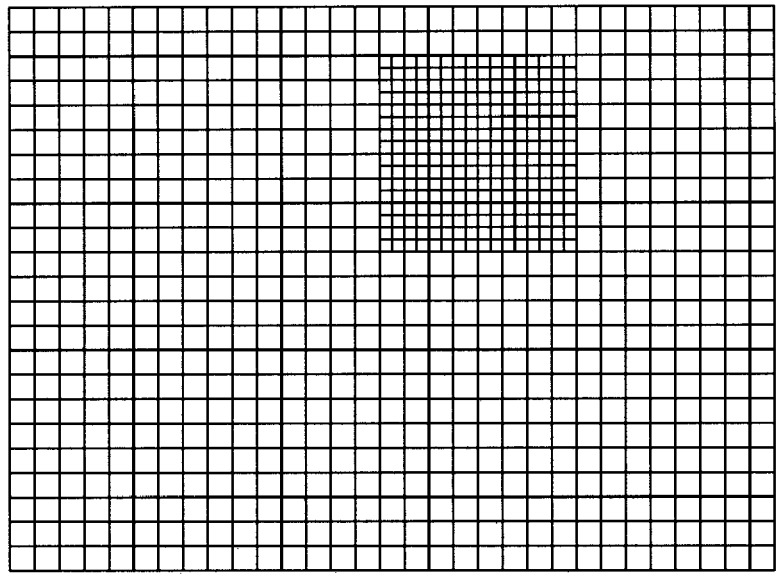
FIG. 6B illustrates a non-uniform calibration grid.
FIG. 7 illustrates a type definition of a linearity map for use in one embodiment of the invention.

In one method that may be used to create a linearity map, a calibration application displays a two-dimensional calibration grid or screen points, similar to that shown in FIG. 6A. In this example, the calibration grid is a 32×24 grid with 713 sectors. After the grid is displayed, the user taps on each intersection point of the grid using the stylus input device. Alternatively, the user may opt not to tap on each intersection point, depending on system characteristics and interference patterns from underlying hardware. That is, a user may choose to tap, or the system may instruct the user to tap, on ever other intersection point in areas subject to less distortion, and ever intersection point in areas subject to higher distortion, thus creating a non-linear map. It should be appreciated that various ways of creating the linearity map are possible.

Alternatively, the calibration process may be automated during the manufacturing process so that users do not need to initially perform calibration when they receive a computing device enabled with linearity correction. In such devices, the user may have the option of re-calibrating the device upon request.

Figure 8:
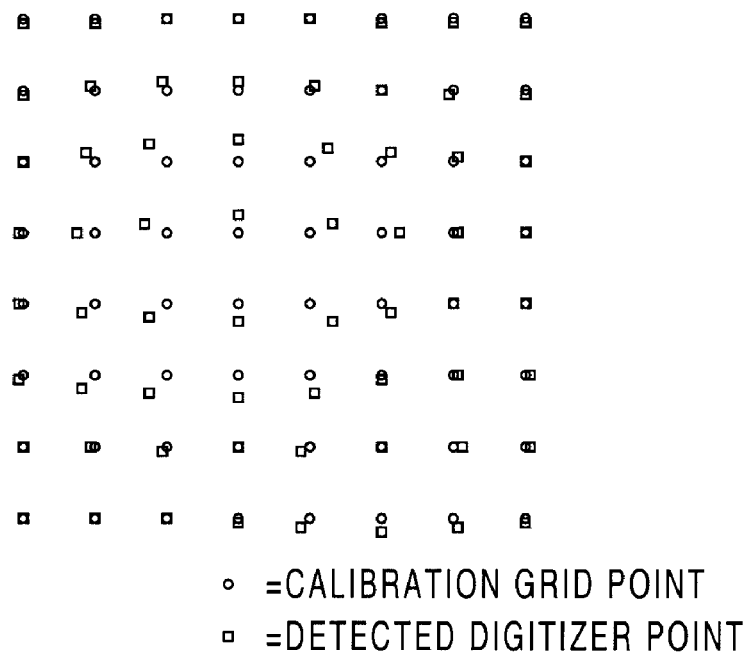
FIG. 8 illustrates a graphical depiction of linearity map calibration input for a portion of a calibration grid in one embodiment of the invention.

The calibration application records the stylus coordinates as the user touches each screen intersection point and generates a two-dimensional linearity map data array, a C/C++ definition of one example is shown in FIG. 7. FIG. 8 shows a graphical representation of a portion of the calibration input for area 250 used to create the linearity map. As is evident in FIG. 8, the detected digitizer point may not exactly match the calibration grid point displayed on the screen.

The linearity map may then be used to map every detected stylus input to a corresponding screen point according to a predetermined algorithm. Before the stylus point can be mapped to a screen point, however, the sector of the linearity map containing each detected stylus point is located. Searching all 713 sectors to locate which one sector contains each detected stylus input would be tedious and unnecessarily consume system resources. Thus, a more efficient search algorithm should be used.

In one embodiment, the algorithm used may be based on the assumption that a subsequent stylus input point is most likely to be in the same sector as the previous stylus input point or, if not in the same sector, is in one of its eight adjacent neighbor sectors. By using this assumption, a loop to find the next stylus input point sector that starts from the previous stylus input point sector will execute one or two iterations most of the time. During each iteration, the algorithm determines whether it needs to move horizontally, vertically, or diagonally by comparing the target coordinates to the current coordinates. Even in a worst case scenario, where the user starts at one corner of the screen and pulls the stylus out of proximity of the digitizer tablet and moves the stylus back within the proximity of the digitizer at the opposite corner of the screen, the algorithm will not do more than max(NUM_LINEAR_XPTS, NUM_LINEAR_YPTS) iterations to locate the next stylus point sector. That is, the algorithm will only need to perform iterations equal to the greater of the number of X grid points or the number of Y grid points, minus one. Thus, using the exemplary 32×24 grid, the maximum number of iterations would be 31 (i.e. 32−1=31). This algorithm is especially applicable when the user is providing written input using the stylus, such that the input is approximately continuous and flowing in nature. In environments where the user is not writing, or input is more random, other search algorithms may be used.

Figure 9:
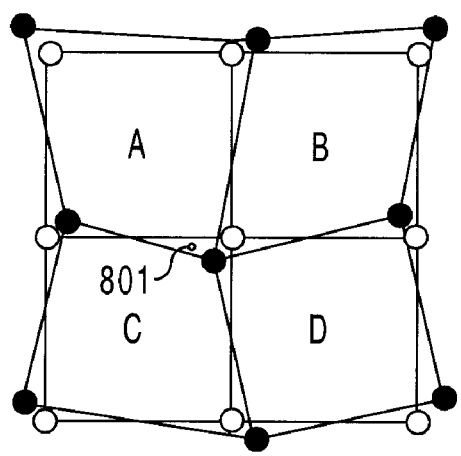
FIG. 9 illustrates an enlarged section of a linearity map overlaid on a calibration grid in one embodiment of the invention.

FIG. 9 shows four enlarged sectors of the linearity map. The calibration points of each sector (black dots) might not form a perfect rectangle, as do the corresponding screen points (white dots), because of the aforementioned linearity errors during the calibration process. Thus, when a user provides input using the stylus, it is often difficult to determine the sector in which the detected stylus input 801 is located. Because each sector might not be a rectangle, further calculations may be needed to determine whether a detected input is in a given sector.

Figure 10:
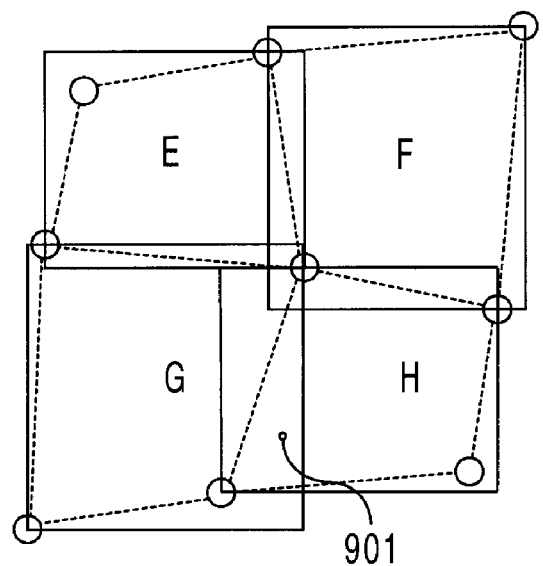
FIG. 10 illustrates a portion of a linearity map whose sectors have been maximized according to one embodiment of the invention.

With reference to FIG. 10, in order to place the detected stylus point in a sector while using less system resources than performing an exact calculation of the sector polygon, the rectangle bounding each sector may be maximized using the four corners of the sector, and the detected stylus point is placed in any sector in whose bounding rectangle it is located. FIG. 10 shows four enlarged sectors of the linearity map where each sector has been maximized. If a given stylus point 901 is near the borderline of the two adjacent sectors G and H, it may be placed in either sector, as it is located in each of the maximized sectors G and H. This is acceptable because the method to interpolate the mapping from digitizer to LCD using the sector corners can also extrapolate.

Figure 11:
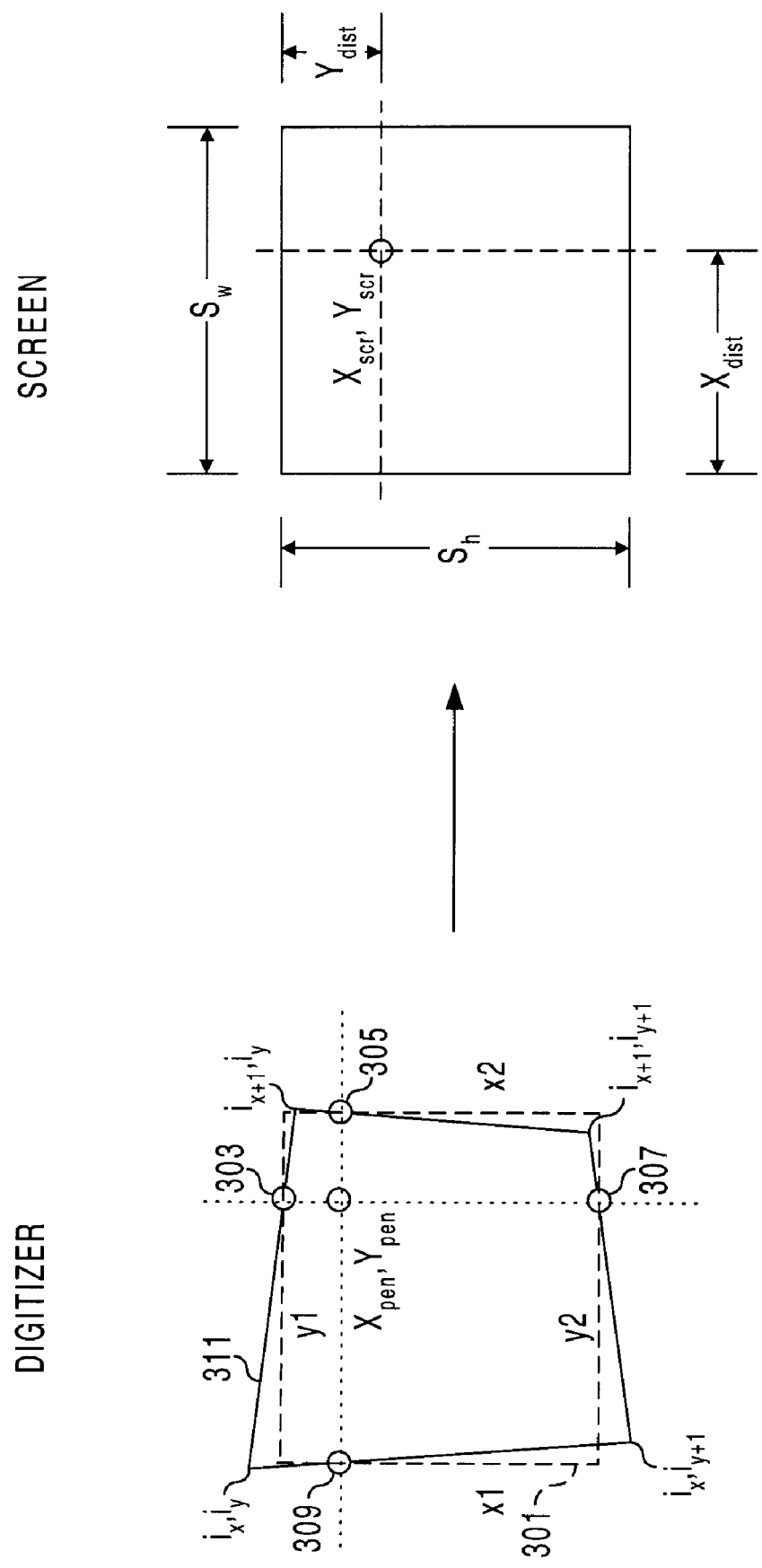
FIG. 11 illustrates a detected stylus point with a reference rectangle in a sector of a linearity map according to one embodiment of the invention.

With reference to FIG. 11, one embodiment of the invention may calculate a reference rectangle 301 from the stylus point's four intersection points 303, 305, 307, 309 with the sector 311 in which the target stylus point ($X_{pen}$, $Y_{pen}$) is located. The reference rectangle may then be used to calculate the linearity compensation. The reference rectangle 301 has left side (x1), right side (x2), top (y1) and bottom (y2), each of which may be calculated using known geometric principles.

For example, to calculate x1 the algorithm first intersects the line defined by ($i_x, i_y$), ($i_x, i_{y+1}$) with the horizontal line defined by $Y_{pen}$. The known ratio "vertical distance between $Y_{pen}$ and the point ($i_x, i_y$)" to "vertical distance between the point ($i_x, i_{y+1}$) and the point ($i_x, i_y$)" should be the same as the ratio "horizontal distance between x1 and the point ($i_x, i_y$)" to "horizontal distance between point ($i_x, i_{y+1}$) and the point ($i_x, i_y$)." Where the function Y(a,b) returns the Y-coordinate of the point represented by (a,b) and the X(a,b) returns the X-coordinate of the point represented by (a,b), x1 may be calculated by solving Equation 1, below, for x1 (the only unknown value):

$$\frac{Y_{pen} - Y(i_x, i_y)}{Y(i_x, i_{y+1}) - Y(i_x, i_y)} = \frac{x1 - X(i_x, i_y)}{X(i_x, i_{y+1}) - X(i_x, i_y)} \quad \text{(Equation 1)}$$

The values x2, y1, and y2 may be calculated in similar fashion. The reference rectangle is the resultant object bounded by lines x1, x2, y1, and y2.

Linear interpolation by proportion may be used to determine the resultant X and Y coordinates on the screen. The distance of the detected stylus input point to the left edge of the reference rectangle may be defined by the formula $X_{pen}$−x1. The width of the reference rectangle may be defined by the formula x2−x1. The distance of the target screen point ($X_{scr}$, $Y_{scr}$) to the left edge of the screen rectangle is referred to as $X_{dist}$. The width of the screen rectangle is referred to as $S_w$. The values $X_{pen}$, $Y_{pen}$, x1, x2, y1, y2, $S_w$, and $S_h$ are known or previously calculated for each detected stylus input point. Thus, the screen x-coordinate ($X_{scr}$) may be calculated by first determining $X_{dist}$ such that the ratio $X_{dist}:S_w$ is equal to the ratio $X_{pen}$−x1:x2−x1, and then adding $X_{dist}$ to the x-value of the left edge of the screen rectangle. Likewise, the screen y-coordinate may be calculated by first determining $Y_{dist}$ such that the ratio $Y_{dist}:S_h$ is equal to the ratio $Y_{pen}$−y1:y2−y1, and then adding $Y_{dist}$ to y-value of the top edge of the screen rectangle.

Figure 12:
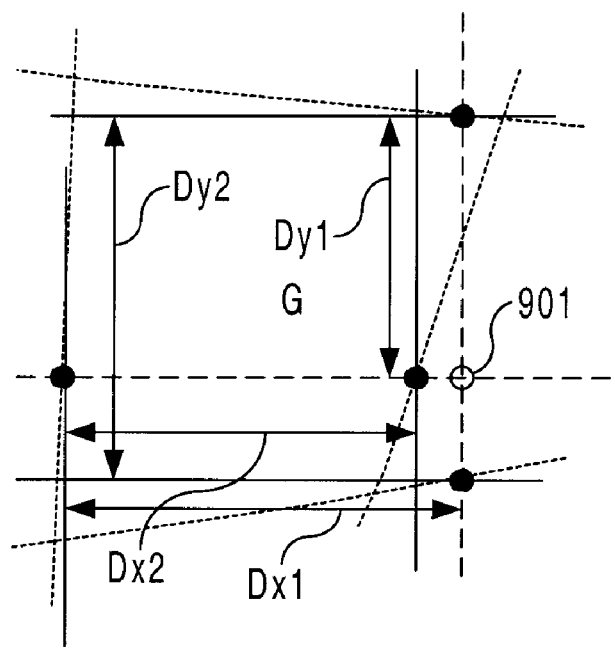
FIG. 12 illustrates a reference rectangle when a detected stylus point is in a maximized sector other than its actual sector.

As previously stated, because each sector is maximized when determining the sector in which a detected input point is located, the detected input point might not be placed in the actual sector in which it is located. For example, with reference to FIGS. 10 and 12, detected stylus input point 901 may be placed in either of maximized sectors G or H. FIG. 12 illustrates the resultant reference rectangle when the detected input point 901 is placed in sector G, instead of its actual sector H.

Placing stylus point 901 in sector G (shown bounded by the small dotted lines), the intersecting points of the stylus point to the sector polygon are shown as black circles. The reference rectangle is formed by using the intersecting points as boundaries (solid lines). Thus, as is shown, the stylus point 901 may be outside of the reference rectangle. However, because the algorithm to interpolate the screen coordinates, above, is based on the ratio of the distance of the stylus point from the boundary lines of the reference rectangle, it may also be used to extrapolate the screen coordinates as well as interpolate them.

Although the black dotted lines of the sector polygon are slanted, they represent constant values (horizontal or vertical lines) of corresponding edges of a screen rectangle, i.e. every point on the slanted line is equivalent to a constant X or Y value of the corresponding edge of the screen coordinates. To calculate the resultant screen coordinates, ratios are again used. The ratio of Dsy1:Dsy2 is calculated to be the same as the ratio Dy1:Dy2, where Dsy1 corresponds to $Y_{dist}$, above, and Dsy2 is the height of the screen rectangle. Similarly, the ratio of Dsx1:Dsx2 is calculated to be the same as the ratio of Dx1:Dx2. Because Dx1 is larger than Dx2, the result of the ratio is greater than one because the value is extrapolated instead of interpolated. That is, the resulting screen coordinates may also be outside of the screen rectangle.

Figures 13, 14:
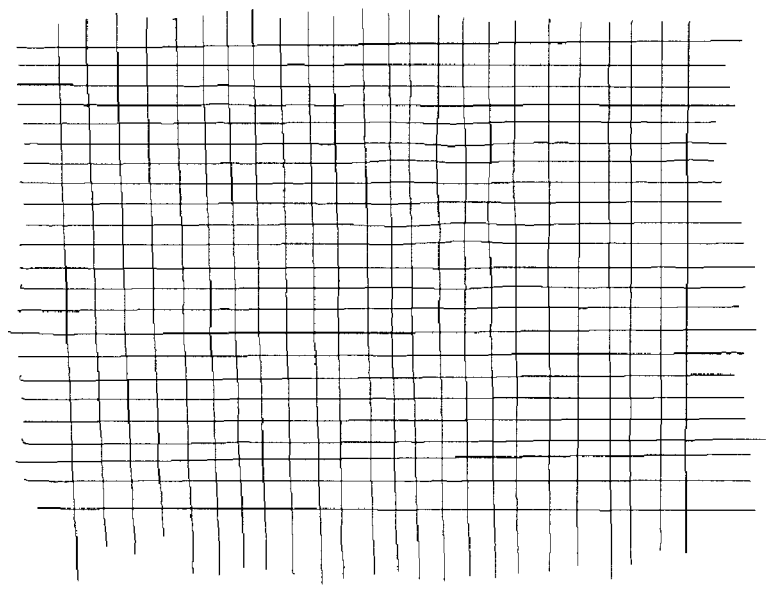
FIG. 13 illustrates computer instructions to calculate X and Y screen coordinates according to one embodiment of the invention.
FIG. 14 illustrates input on display device using linearity compensation according to one embodiment of the invention.

Calculations written in C/C++ to calculate the screen coordinates according to an embodiment of the invention are shown in FIG. 13, where $(i_x, i_y)$ are the array indices of the upper left corner of the maximized sector containing the detected stylus input point in the map.

Figure 4:
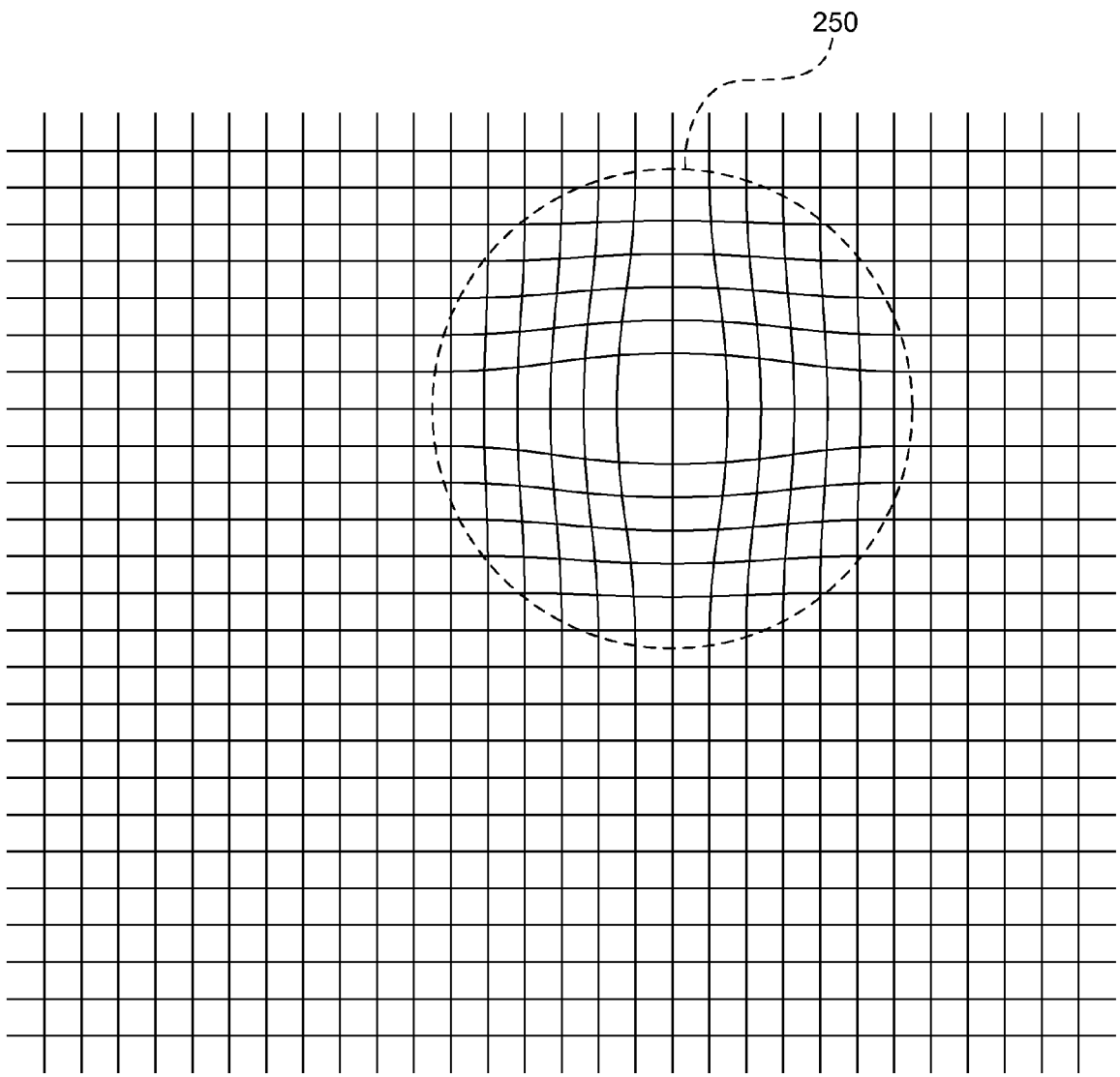
FIG. 4 illustrates input on a display device that has no linearity compensation.

In contrast to FIG. 4, FIG. 14 shows lines drawn using a straight edge ruler on a device that performs alignment and linearity compensation according to the invention.

Using the above method and system, the invention adjusts the reference rectangle continuously as the given stylus point moves around in a sector. When the stylus point crosses two adjacent sectors, the transition is smooth because the reference rectangle is weighted toward the joining edge of the adjacent sectors as it moves closer to the boundary. That is, with reference to FIG. 10, if the stylus point 901 was inside of actual sector G and was very close to the left edge of the sector polygon (with y-value unchanged), the stylus point would be approximately two-thirds down in its resultant reference rectangle versus about three-fourths down from the reference rectangle for original stylus point 901 shown in FIG. 12. The reference rectangle changes responsive to the location of the stylus point 901. As the stylus point 901 slides from the left side of the sector polygon to the right, the height of the reference rectangle constantly changes, as does the ratio of the stylus point to the reference rectangle. Also, adjoining sectors always have the same width and/or height due to the commonality of the two bounding points shared by each sector. Thus the transformation from one sector to the next is a continuous function without sudden jerks when crossing a sector boundary.

Programming languages other than C/C++ may be used to perform the invention. The instructions for performing the inventive method may be stored in one or more memories of the computer 100, such as in the hard disk 170, magnetic disk 190, optical disk 192, or other suitable computer readable medium, such that when the instructions are carried out by the processing unit 110, the computer 100 is caused to perform in accordance with the invention.

The invention as described above compensates for alignment differences while it compensates for linearity errors. In addition, the alignment is corrected regardless of whether the LCD's resolution is the same as the digitizer's resolution by correcting the user provided input according to the above described method and system.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

I claim:

1. One or more computer readable media storing computer executable instructions for performing a method of creating a linearity map, said method comprising the steps of:
   (i) touching a display device at a plurality of predetermined locations defined by a calibration grid corresponding to the display device, wherein the calibration grid is non-uniform, and the calibration grid comprises a first area of a first calibration density and a second area of a second calibration density different from said first calibration density;
   (ii) detecting in a digitizer coupled to the display device, coordinates for each touched predetermined location; and
   (iii) recording each predetermined location's screen coordinates and corresponding detected digitizer coordinates.

2. The computer readable media of claim 1, wherein the calibration grid is displayed on the display device.

3. The computer readable media of claim 1, wherein the information recorded in step (iii) is recorded in an array.

4. The computer readable media of claim 3, wherein the array is two-dimensional, and each array element corresponds to an intersection of the calibration grid.

5. The computer readable media of claim 1, wherein the calibration grid is non-uniform along both its X-axis and Y-axis.

6. One or more computer readable media storing computer executable instructions for performing a method for creating a linearity map, said method comprising the steps of:
   (i) detecting touch input on a display device at a plurality of predetermined locations;
   (ii) detecting on a digitizer, coordinates for each touched predetermined location; and
   (iii) recording each predetermined location's screen coordinates and corresponding detected digitizer coordinates,
   wherein a calibration grid displayed on the display device coupled to the digitizer defines the predetermined locations, and
   wherein the calibration grid is non-uniform, and comprises a first area of a first density and a second area of a second density.

7. The computer readable media of claim 6, wherein the first area corresponds to an area of higher distortion within a data processing device, and the second area corresponds to an area of lower distortion within the data processing device.

8. The computer readable media of claim 6, wherein the information recorded in step (iii) is recorded in a non-linear array.

9. The computer readable media of claim 6, wherein the calibration grid is non-uniform along both its X-axis and Y-axis.

10. One or more computer readable media storing computer executable instructions for performing a method of creating a linearity map, said method comprising the steps of:
   (i) detecting touch input corresponding to a plurality of predetermined locations on a display device, said locations defined by a calibration grid corresponding to the display device, wherein the calibration grid is non-uniform, and the calibration grid comprises a first area of a first calibration density and a second area of a second calibration density different from said first calibration density;

(ii) detecting in a digitizer coupled to the display device, coordinates for each touched predetermined location; and (iii) recording each predetermined location's screen coordinates and corresponding detected digitizer coordinates, wherein the first area corresponds to an area of higher distortion within a data processing device, and the second area corresponds to an area of lower distortion within the data processing device.

11. The computer readable media of claim 10, wherein the calibration grid is displayed on the display device.

12. The computer readable media of claim 10, wherein the information recorded in step (iii) is recorded in an array.

13. The computer readable media of claim 12, wherein the array is two-dimensional, and each array element corresponds to an intersection of the calibration grid.

14. The computer readable media of claim 10, wherein the information recorded in step (iii) is recorded in a non-linear array.

15. The computer readable media of claim 10, wherein the calibration grid is non-uniform along both its X-axis and Y-axis.

* * * * *

UNITED STATES PATENT AND TRADEMARK OFFICE
CERTIFICATE OF CORRECTION

PATENT NO.        : 7,646,380 B2                              Page 1 of 1
APPLICATION NO. : 11/466003
DATED             : January 12, 2010
INVENTOR(S)       : Michael H. Tsang It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 667 days.

Signed and Sealed this

Sixteenth Day of November, 2010

David J. Kappos
*Director of the United States Patent and Trademark Office*